US012578073B2

(12) United States Patent
Nykerk

(10) Patent No.: US 12,578,073 B2
(45) Date of Patent: Mar. 17, 2026

(54) OPTICAL VOID PATTERN LIGHTING ARRANGEMENT

(71) Applicant: Flex-N-Gate Advanced Product Development, LLC, Windsor (CA)

(72) Inventor: Todd Nykerk, Holland, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 18/903,737

(22) Filed: Oct. 1, 2024

(65) Prior Publication Data

US 2025/0109837 A1 Apr. 3, 2025

Related U.S. Application Data

(60) Provisional application No. 63/587,373, filed on Oct. 2, 2023.

(51) Int. Cl.
*F21V 5/00* (2018.01)

(52) U.S. Cl.
CPC .................................... *F21V 5/002* (2013.01)

(58) Field of Classification Search
None
See application file for complete search history.

(56) References Cited

U.S. PATENT DOCUMENTS

| | | | | |
|---|---|---|---|---|
| 8,969,757 | B2 | 3/2015 | Norimatsu et al. | |
| 8,995,029 | B2 | 3/2015 | Shah et al. | |
| 2007/0037065 | A1 | 2/2007 | Kutsch et al. | |
| 2011/0255264 | A1* | 10/2011 | Tsutsumi | F21V 9/40 362/84 |
| 2012/0099199 | A1* | 4/2012 | Vasylyev | B29D 11/00605 359/530 |
| 2012/0327685 | A1* | 12/2012 | Song | G02B 6/0038 427/595 |
| 2017/0343717 | A1 | 11/2017 | Randazzo | |
| 2018/0117709 | A1 | 5/2018 | Wetzig et al. | |
| 2020/0080705 | A1* | 3/2020 | Crespin | B60Q 1/34 |
| 2021/0387570 | A1* | 12/2021 | Piles Guillem | B44C 5/04 |
| 2024/0168202 | A1* | 5/2024 | Macpherson | B42D 25/351 |

FOREIGN PATENT DOCUMENTS

| | | | | |
|---|---|---|---|---|
| DE | 102021134279 A1 * | 6/2023 | | G02F 1/1334 |

* cited by examiner

*Primary Examiner* — Christopher E Dunay
(74) *Attorney, Agent, or Firm* — Avek IP, LLC

(57) ABSTRACT

A lighting arrangement system including a light source and an optical void pattern formed into a substrate. The optical void pattern is formed using a laser and includes voids configured to alter light paths of light rays emitted from the light source directed towards the void pattern. The light paths are altered to form a light ray emission arrangement emitted from the substrate.

13 Claims, 7 Drawing Sheets

OPTICAL VOID PATTERN LIGHTING ARRANGEMENT

CROSS-REFERENCE TO RELATED APPLICATIONS

This application claims the benefit of U.S. Provisional Patent Application No. 63/587,373, filed Oct. 2, 2023, the entire contents thereof are herein incorporated by reference.

BACKGROUND OF THE INVENTION

1. Field

The disclosed embodiments relate generally to the field of lighting displays. More specifically, the disclosed embodiments relate to providing an optical system to direct light.

2. Description of the Related Art

Many different types of lighting displays having an optical system to direct light exist. One example is U.S. Pat. No. 8,969,757 to Norimatsu et al. discloses a laser beam used to transcribe or engrave images on an engraving material. Norimatsu discloses a laser beam using a scanning device to scan the engraving material for relief manufacturing methods.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a method for generating an optical void pattern lighting arrangement, the method including: directing a laser beam of a laser to a first surface of an optical substrate; creating an optical void pattern via the laser such that at least one void is formed in the optical substrate; and directing light rays from a light source towards the optical substrate such that a light path of the light rays is altered via the at least one void thereby generating a light ray pattern emitted onto an object positioned away from the optical substrate.

In some embodiments, the techniques described herein relate to a method wherein the light source is included of one or more light emitting diodes.

In some embodiments, the techniques described herein relate to a method including positioning the light source approximately six inches to approximately eighteen inches away from the optical substrate.

In some embodiments, the techniques described herein relate to a method wherein the laser has a wavelength of approximately four hundred nanometers to approximately six hundred nanometers.

In some embodiments, the techniques described herein relate to a method wherein the at least one void has a diameter of approximately ten microns to approximately fifty microns.

In some embodiments, the techniques described herein relate to a method wherein the optical void pattern is formed using a software component configured to control the laser directed towards the optical substrate.

In some embodiments, the techniques described herein relate to a method wherein the software component is programmed to control the laser and form the optical void pattern to produce a specified light ray emission arrangement.

In some embodiments, the techniques described herein relate to a method wherein the at least one void is positioned between the first surface and a second surface of the optical substrate without contacting the first surface or the second surface.

In some embodiments, the techniques described herein relate to a light arrangement system, the system including: an optical substrate; an optical void pattern formed in the optical substrate by a laser directed towards the optical substrate; and a light source directed towards the optical void pattern, wherein the optical void pattern is configured to refract a light path of the light source to form a light ray emission pattern, wherein the light ray emission pattern is projected away from the optical substrate.

In some embodiments, the techniques described herein relate to a system including forming a plurality of voids in the optical void pattern, wherein the voids include substantially different depths for altering the light path in different directions based on the different depths.

In some embodiments, the techniques described herein relate to a system wherein the laser is directed towards a first surface of the optical substrate.

In some embodiments, the techniques described herein relate to a system wherein the light ray emission pattern is projected away from the optical substrate.

In some embodiments, the techniques described herein relate to a system wherein the optical substrate is fabricated from polymethyl methacrylate.

In some embodiments, the techniques described herein relate to a system including fabricating the optical substrate from a polycarbonate material.

In some embodiments, the techniques described herein relate to a system wherein the optical substrate is substantially translucent.

In some embodiments, the techniques described herein relate to a system wherein the optical substrate is approximately 0.05 inches thick to approximately twelve inches thick.

In some embodiments, the techniques described herein relate to a system wherein the optical void pattern includes a plurality of microfractures in the optical substrate.

In some embodiments, the techniques described herein relate to a system wherein the optical substrate and the light source are disposed in a vehicle headlamp.

In some embodiments, the techniques described herein relate to a system wherein the light ray emission pattern is offset at an angle away from the light source.

In some embodiments, the techniques described herein relate to a system wherein the optical void pattern is formed into a first surface and a second surface of the optical substrate.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
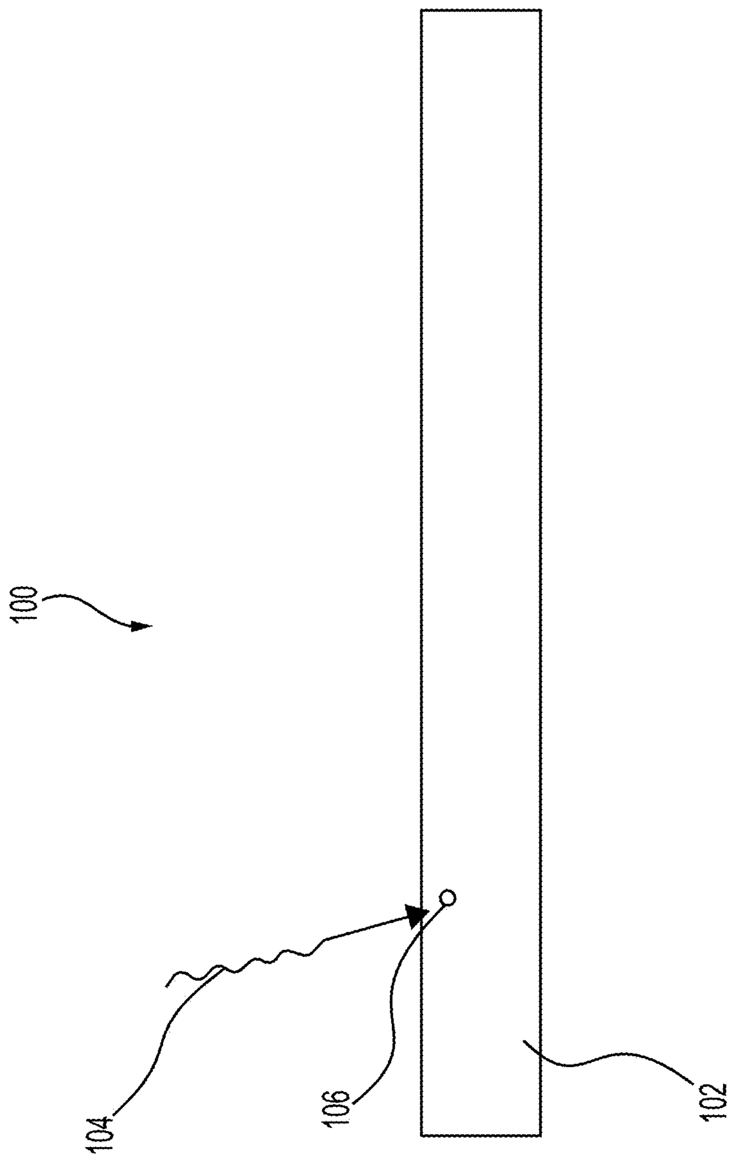
FIG. 1 shows a laser pulse being directed to an optical substrate in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide a system and method for subsurface laser engraving of an optical substrate to generate an optical beam emission pattern for lighting arrangements. Embodiments within include a laser beam used to create high energy pulses about a singular point or a plurality of points. The high energy pulses generated by the laser in one or numerous points create positioned voids or fractures within an optical substrate. The strategic location of the voids or holes within the optical substrate are used to refract and substantially alter light rays emitted from a light source directed toward the optical substrate. The strategic position, orientation, and count of the voids or fractures may be used to alter and refract the disposed light rays in numerous different ways and may be arranged strategically to meet a required beam or light ray emission pattern. The present lighting arrangement can produce these lighting effects with only a single optical substrate. Prior art lighting arrangements, such as those found on vehicles, typically require multiple substrates or lenses requiring higher costs and complex designs.

Disclosed are processes for using a subsurface laser to engrave an optical void pattern for generating a light ray emission arrangement. Also disclosed, are articles created using these processes. In more specific embodiments, the disclosed processes are used to create optically active components, e.g., lenses or substrates having lens-like properties, for use with vehicle headlamps.

In one embodiment, the subsurface laser is used to create one or many voids or fractures into a substrate material. The void or voids formed by the laser within the substrate are arranged such that the configuration of the voids allows a light ray to be substantially altered (e.g., redirected and/or refracted) when the light ray is directed towards the substrate comprising the voids. The voids or fractures may be strategically arranged so that altered light rays provides a desired beam/light ray emission pattern. Additionally, completely new beam emission patterns may be created which were not accomplishable or anticipated by earlier optical beam emission methods.

FIG. 1 shows a lighting arrangement system 100. The lighting arrangement system 100 includes an optical substrate 102 having a void 106, which can be formed via a laser pulse 104. In embodiments, the optical substrate 102 may be fabricated from a polycarbonate (PC) material and may be substantially translucent or clear. In embodiments, the optical substrate 102 is substantially flat and has smooth outer surfaces, however, in other embodiments the substrate 102 may have a curvature. In some embodiments, the substrate 102 may be fabricated from a Polymethyl Methacrylate (PMMA) and may also be substantially translucent or clear. In embodiments, the substrate 102 may be approximately 0.25 inches thick to approximately five inches thick. In other embodiments, the substrate 102 may be approximately 0.10 inches thick to approximately eight inches thick.

The laser pulse 104 may be emitted from a laser emitting device (not shown). The laser emitting device may be capable of emitting a laser pulse 104 with high amounts of energy. In embodiments, the laser pulse 104 may have an energy strength correspondent to a measured wavelength, which may be approximately 532-nm and may be directed at the substrate 102 for a plurality of milliseconds or other length of time such that a void 106 is able to form in the substrate 102. The laser emitting device may emit a laser pulse 104 which is substantially colored green in embodiments. In other embodiments laser beams having numerous different colors may be used. In an embodiment shown in FIG. 1, the laser pulse 104 is directed at some angle relative to the substrate 102 and with an energy such that void 106 forms within the substrate 102. The void 106 may be formed when the laser pulse 104 creates a microfracture or a plurality of microfractures in the substrate 102. The void 106 may be strategically placed at a chosen position on the substrate 102. In some embodiments, the voids 106 may be formed at an angle relative to the surface of the substrate 102, and in other embodiments the voids 106 may be formed perpendicular to the substrate 102 surface. In some embodiments, the laser pulse 104 may be controlled and directed to form voids 106 in the substrate 102. An algorithm or software may be programmed into a software component to control the laser pulse 104 to form voids 106 at strategic locations and angles on the substrate 102. In the embodiment shown in FIG. 1, a single void 106 with a spherical shape is created within the substrate 102 by the laser pulse 104. The void 106 may have a diameter of approximately 10-microns to approximately 50-microns. In other embodiments, a plurality of voids 106 may be placed at any position within the substrate 102 with a variety of different shapes, sizes, and configurations. In embodiments the void 106 is engraved a depth into the substrate 102 such that the void 106 does not extend completely through the substrate 102.

Figure 2:
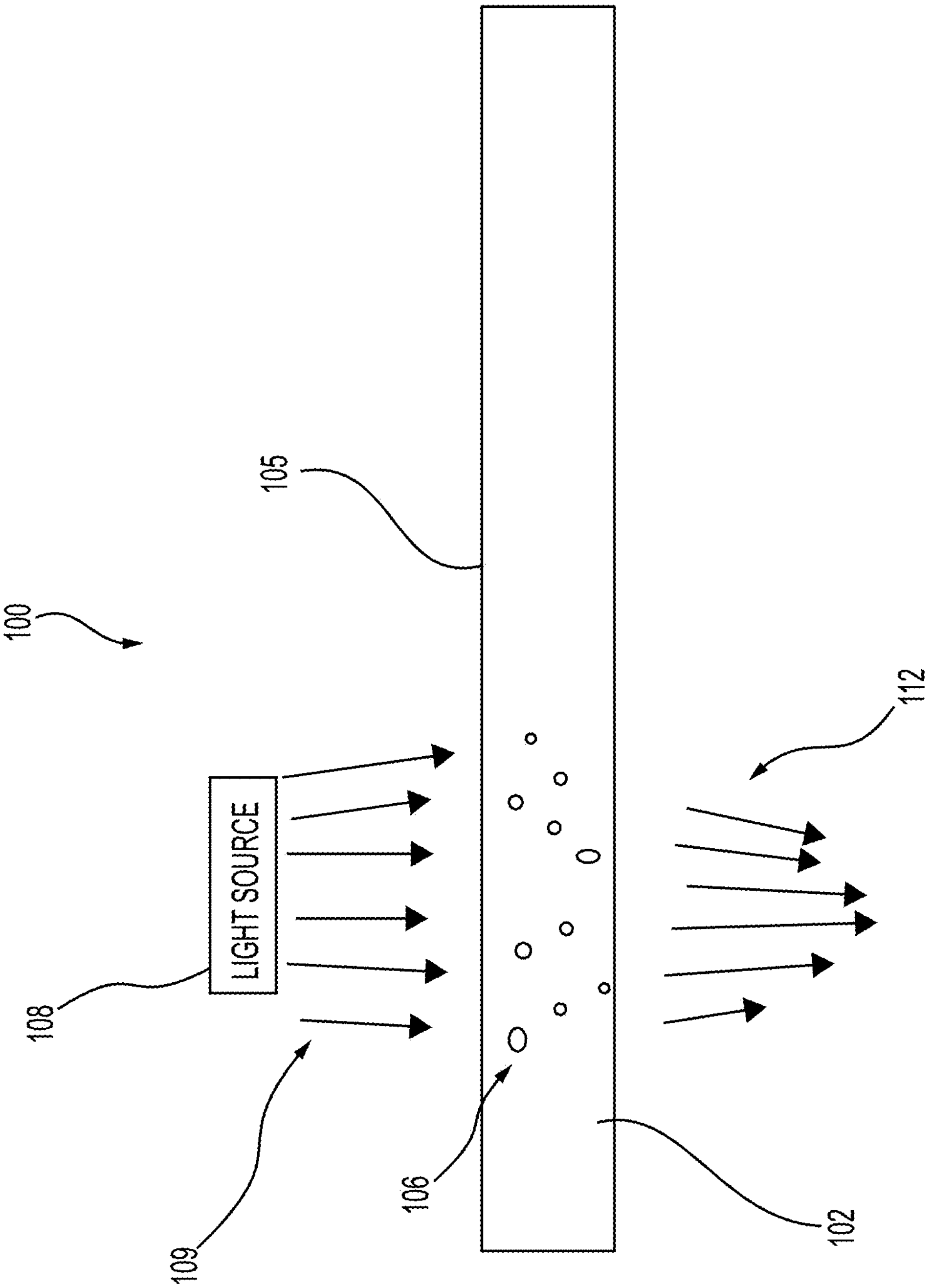
FIG. 2 shows a light source being directed to a plurality of voids in the optical substrate in an embodiment.

FIG. 2 shows the lighting arrangement system 100 including numerous voids 106. As an example, ten voids 106 having numerous different sizes and shapes are shown in substrate 102. In other embodiments, a single void 106 or a plurality of voids 106 may exist anywhere within the substrate 102. A light source 108 is shown to be positioned away from a first surface 105 of the substrate 102 and oriented such that light rays 109 emitted from the light source 108 are directed towards first surface 105 and the voids 106 of the optical void pattern within the substrate 102. The light source 108 may be positioned approximately twelve inches away from the substrate 102 in some embodiments and substantially perpendicular to the first surface 105 of substrate 102. The light source 108 may be a light emitting diode (LED), an array of LEDs, or any type of light source which emits visible light, any of which should not be considered limiting within the scope of this application. When the light rays 109 are directed into and are refracted via the voids 106, the light paths of the light rays are refracted so that a light ray emission pattern 112 is disposed away from the optical void pattern and onto an object 114 positioned away from the substrate 102. The light ray emission pattern 112 may be an optical beam pattern or a beam emission pattern. The voids 106 of the optical void pattern may be strategically configured anywhere within the substrate 102 to produce a desired light ray emission pattern 112 shape, size, and location. In other words, the voids 106 may be configured in numerous different arrangements to refract the passing light rays 109 to form a desired light ray emission pattern 112. One light ray 109 may pass through a single void 106 or many voids 106, and a plurality of light rays may pass through a single void 106 or many voids 106 to be refracted and project a varied light ray emission pattern 112. The light ray emission pattern 112 may include numerous different types of beam patterns or light emissions.

Figure 3:
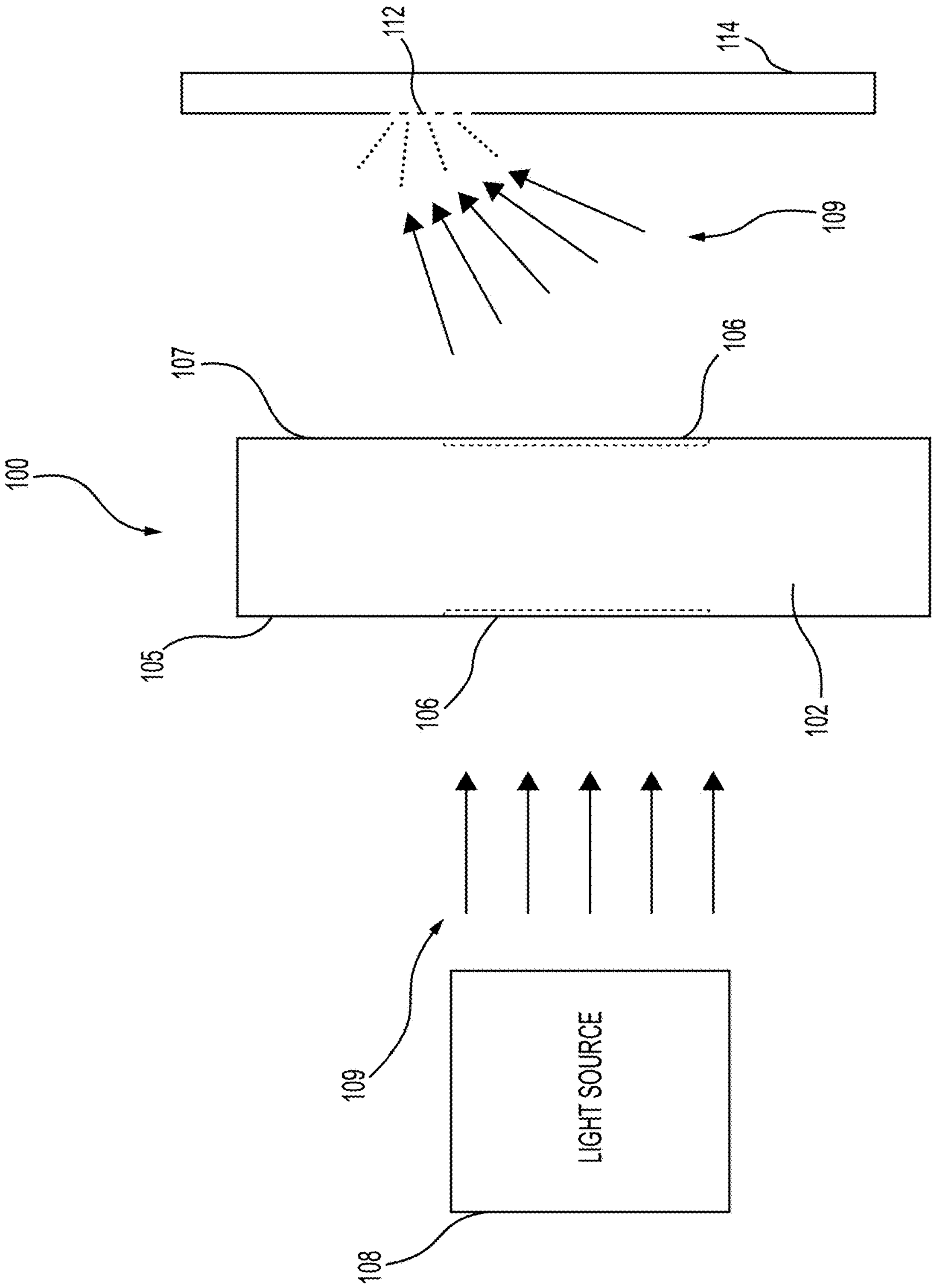
FIG. 3 shows a side view of a light source being directed towards an optical void pattern formed into the optical substrate to generate a light ray emission arrangement.

FIG. 3 shows a side view of the lighting arrangement system 100. The voids 106 are aligned with one another adjacent the first surface 105 and second surface 107 and extend into each of the surfaces 105 and 107. The light source 108 is directed to emit light rays 109 towards the first surface 105 of substrate 102 such that the light rays encounter voids 106 engraved into first surface 105 before passing through the substrate 102 and encountering voids 106 engraved into second surface 107. When the light rays 109 pass from one medium to another (i.e. air to substrate to air) the light rays 109 are refracted and can be redirected. In some embodiments, voids 106 and the substrate 102 act as a lens configured to refract and alter passing light rays 109.

Figure 4:
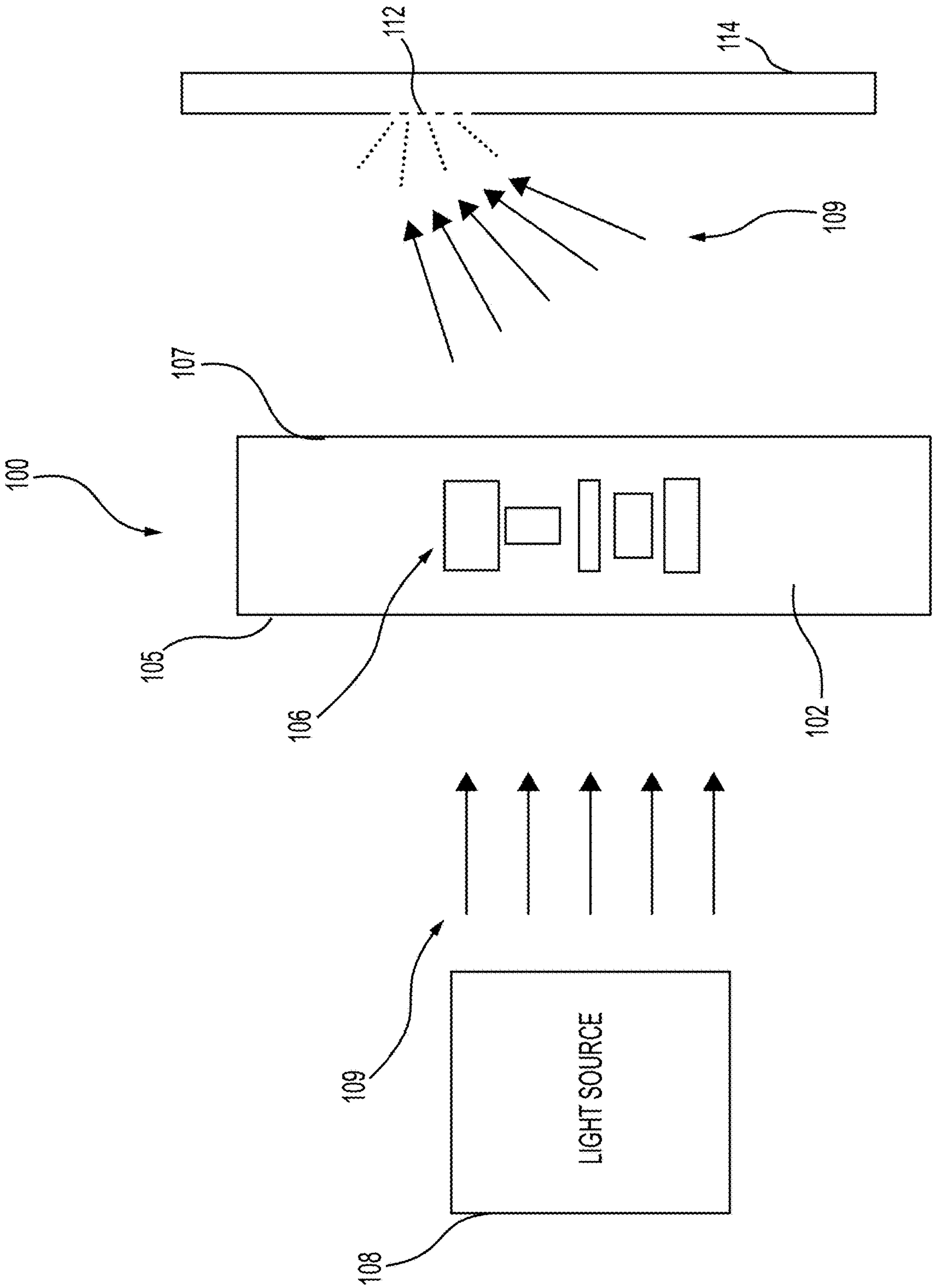
FIG. 4 shows a cross-sectional view of the light source being directed to an optical void pattern in the optical substrate to generate the light ray emission arrangement in an embodiment.

FIG. 4 shows a cross-sectional view of the lighting arrangement system 100 of FIG. 1. In the embodiment shown in FIG. 4, each of the voids 106 are positioned within the substrate 102. In embodiments, the length of each void 106 within the substrate 102 may be any amount less than the thickness of the substrate 102. For example, as depicted in FIG. 4, the voids 106 may comprise substantially different lengths compared to one another. In other embodiments, the voids 106 may extend different depths into the substrate 102 from either the first surface 105 or second surface 107 (not shown). The depth of each void may allow the void 106 to extend completely through substrate 102. In some embodiments, the distance each void 106 intrudes into or is formed within the substrate 102 may be largely similar. In other embodiments, as shown in FIGS. 3, 5, and 6, the voids 106 may be formed into both or either of the first surface 105 and second surface 107 of the substrate 102.

Figure 5:
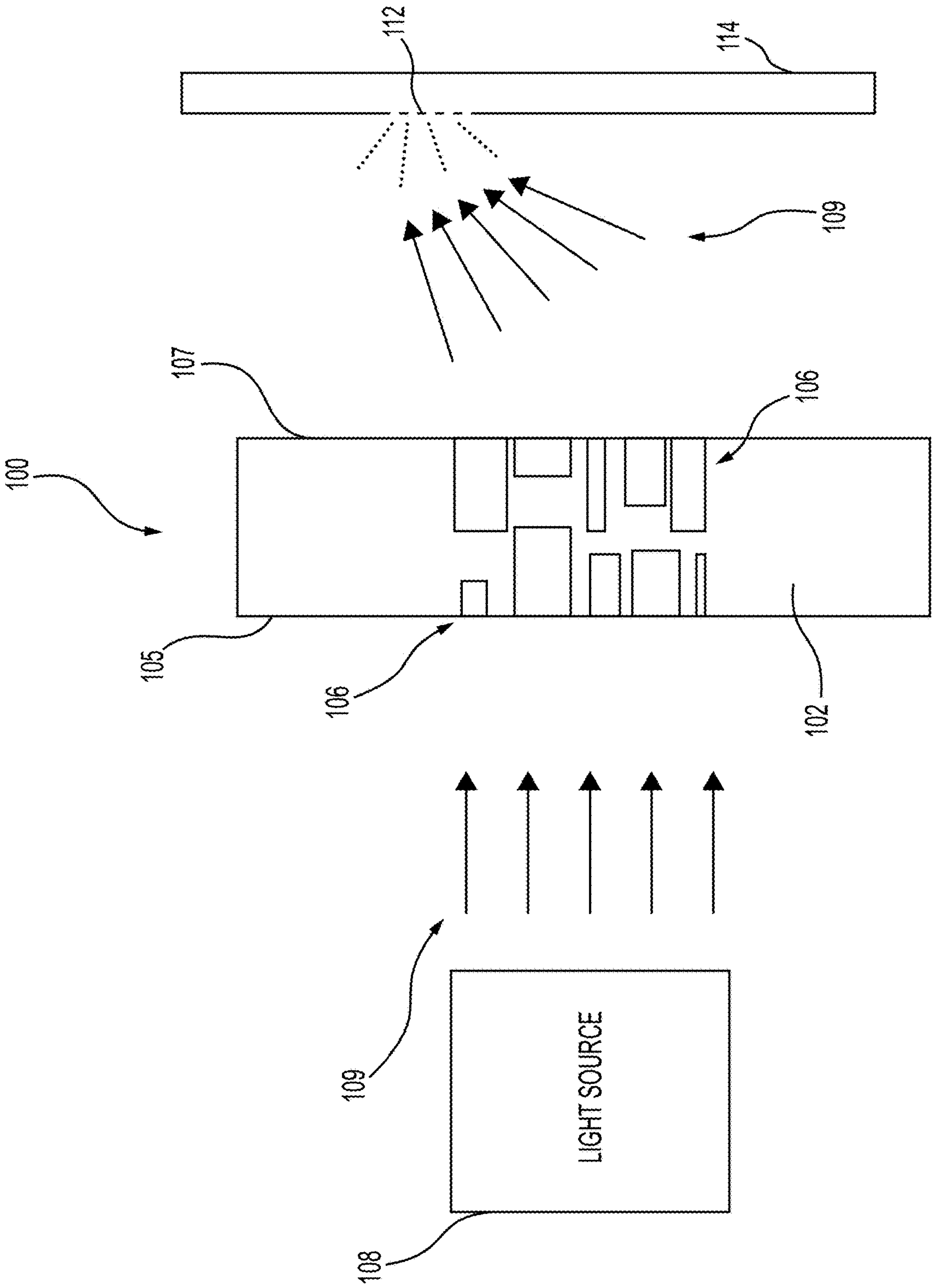
FIG. 5 shows a cross-sectional view of the optical substrate having an optical void pattern for producing a light ray emission arrangement, in an embodiment.

With reference to FIGS. 3, 4, and 5 the light rays 109 are directed towards the first surface 105 of substrate 102 such that the light rays 109 pass through the voids 106 and the substrate 102. When the light rays 109 pass through voids 106 and substrate 102, the light rays 109 are refracted and substantially redirected such that a light ray emission pattern 112 is projected onto an object 114 positioned away from substrate 102. In embodiments, the light rays 109 are refracted in a way such that the light rays 109 are bent/angled for the light ray emission pattern 112 to be offset from the light source 108. In embodiments, the light rays 109 can become substantially condensed/concentrated after passing through voids 106 of the substrate 102 to project the light ray emission pattern 112 onto the object 114.

Figure 6:
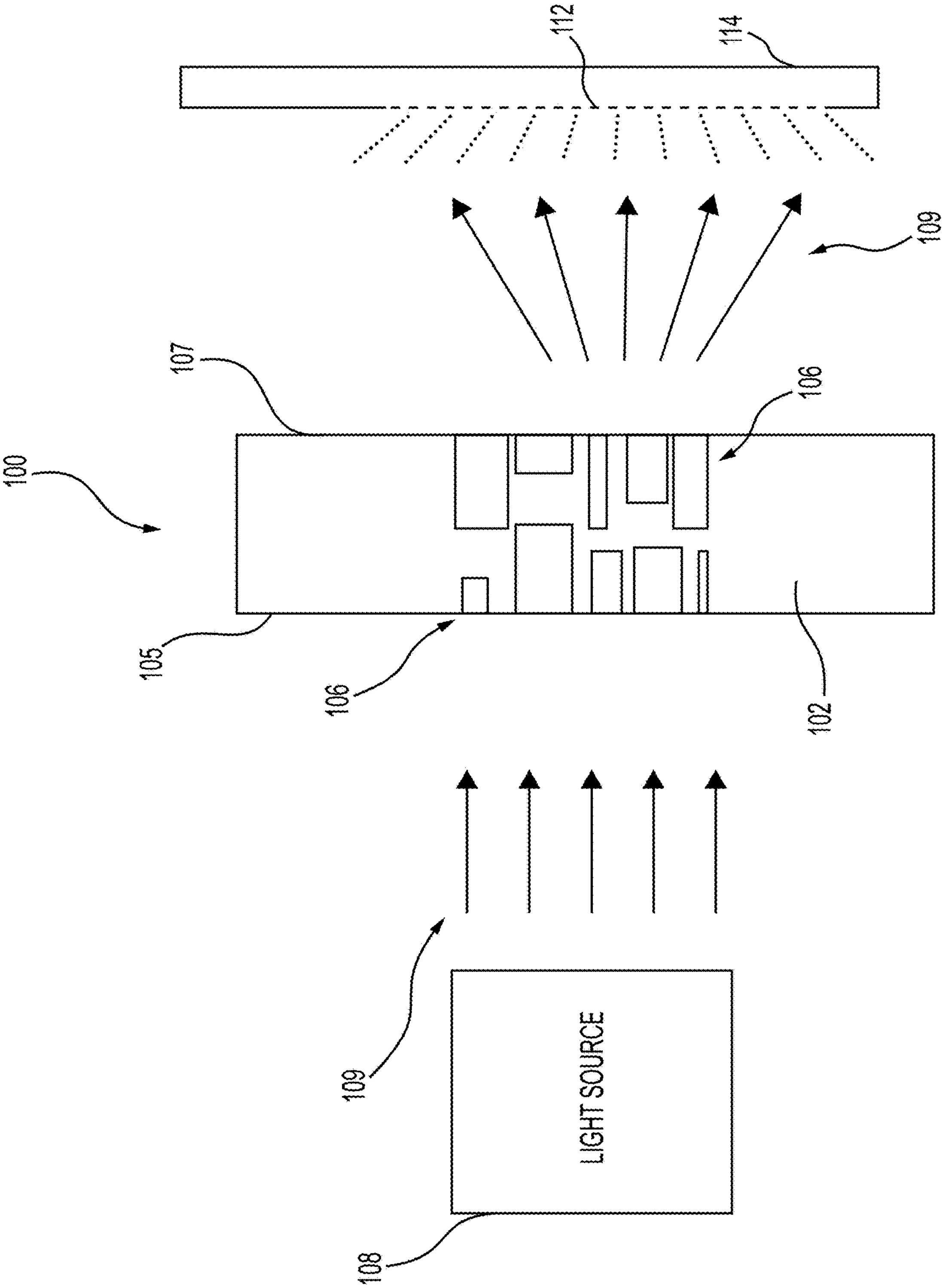
FIG. 6 shows a cross-sectional view of the optical substrate having an optical void pattern for producing a different light ray emission arrangement, in an embodiment.

In other embodiments, with reference to FIG. 6, the light rays 109 can be dispersed after passing through the substrate 102 such that the light ray emission pattern 112 is projected onto a larger area of the object 114. In some embodiments, such as that shown in FIG. 6, the light ray emission pattern 112 may not be substantially displaced from the emitted direction of the light source 108.

In embodiments, the voids 106 can be strategically positioned, shaped, and oriented to produce a desired light ray emission pattern 112 on an object 114. For instance, in embodiments shown in FIGS. 3, 4, and 5 the voids 106 are arranged such that the light ray emission pattern 112 is refracted and redirected upwards from the light source 108, and in FIG. 6 the voids 106 are arranged such that the light ray emission pattern 112 is substantially aligned with light source 108. The voids 106 can be arranged to concentrate or disperse the light rays 109 such that the light ray emission pattern 112 projected onto the object 114 can be dimmer or brighter.

Figure 7:
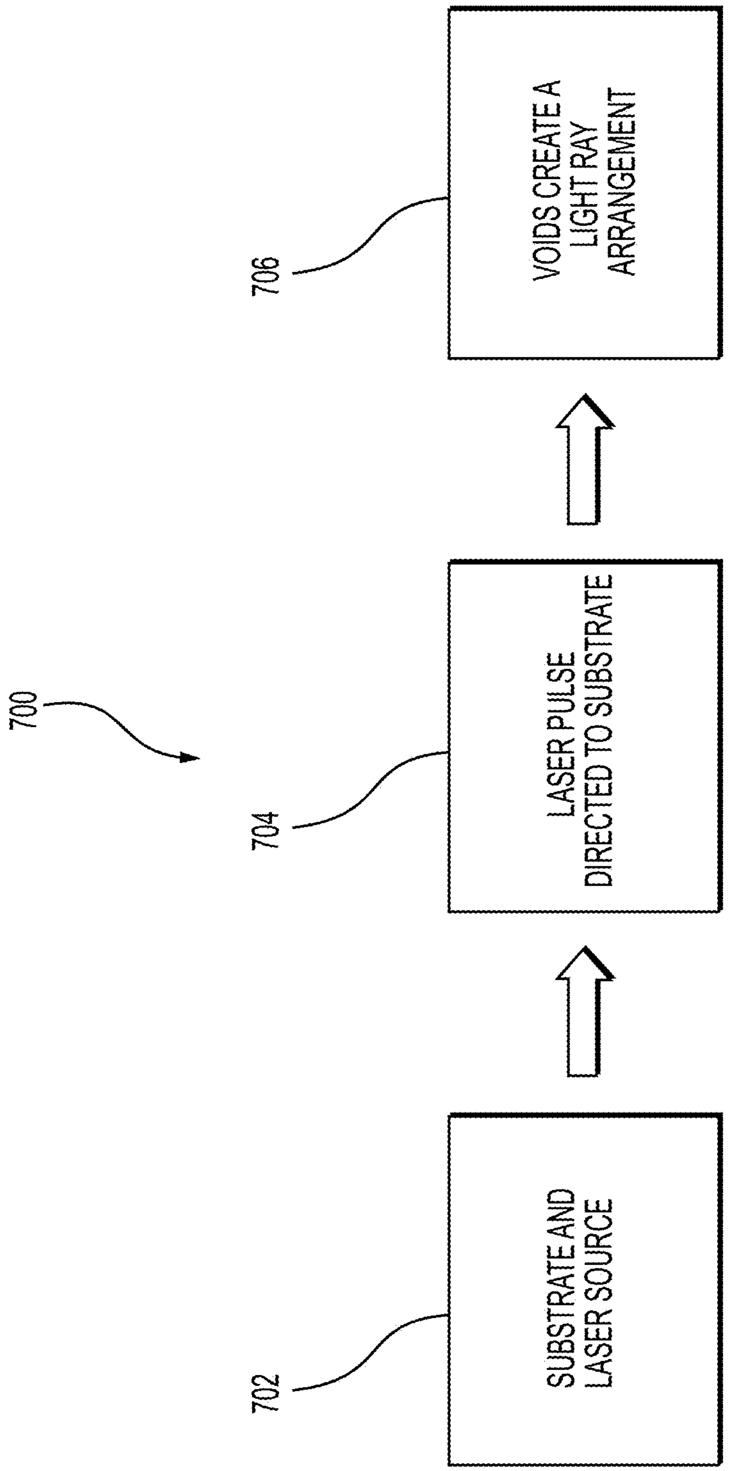
FIG. 7 shows a method flow diagram for generating a light ray emission arrangement with an optical substrate having voids, in an embodiment.

Shown in FIG. 7 is a process flow diagram detailing a method 700 for using a subsurface laser to create an optical void pattern for lighting arrangement system 100.

In a step 702, a substrate and a laser pulse are provided. For instance, in embodiments, the laser pulse 104 may be created from a type of laser emitting device or a green laser designed for subsurface engraving. The substrate 102 may be translucent or optically clear in appearance and may have smooth outer surfaces and may be substantially flat.

In a step 704, the laser pulse 104 is energized and directed to the substrate 102. For instance, the laser source may be placed some distance away from a first surface 105 of the substrate 102 and transmit a laser pulse 104 directed to the first surface 105 of the substrate 102. The laser pulse 104 directed at the substrate 102 may have high amounts of energy to cause at least one void 106 to form beneath the first surface 105 of the substrate 102. The laser pulse 104 may be directed at a plurality of different positions on the first surface 105 of the substrate 102 so that a plurality of voids 106 may be formed in the substrate 102. The void or voids 106 may each have a consistent depth or each void 106 may have different depths of intrusion into the substrate 102.

In a step 706, the void or voids 106 created by the high energy laser pulse 104 are exposed to a light source 108. For instance, the light source 108 may be a LED or another type of device which emits visible light. The light source 108 may be placed a distance away from the substrate 102 and directed such that the light rays 109 emitted from the light source 108 pass into and are refracted within void or voids 106 of the optical void pattern configured on the first surface 105 and/or second surface 107 of the substrate 102. When the light rays 109 pass into and through the voids 106, the light paths are refracted and altered such that a light ray emission pattern 112 can be disposed onto an object 114 positioned away from the substrate 102. In embodiments, the light ray emission pattern 112 is a beam emission pattern disposed onto an object which can be a vehicle headlamp.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A light arrangement system for a vehicle headlamp, the system comprising:

an optical substrate;

an optical void pattern formed in the optical substrate by a laser directed towards the optical substrate, wherein the optical void pattern comprises a plurality of voids within the optical substrate that do not extend to any surface of the optical substrate; and a light source directed towards the optical void pattern, wherein the optical void pattern is configured to refract a light path of the light source to form a light ray emission pattern, wherein the optical substrate and the light source are disposed in the vehicle headlamp to act as a lens and the light ray emission pattern is projected outwards from the vehicle headlamp.

2. The system of claim 1 wherein the optical void pattern comprises a plurality of voids each having substantially different depths for altering the light path in different directions based on the different depths.

3. The system of claim 1 wherein the laser is directed towards a first surface of the optical substrate.

4. The system of claim 1 wherein the light ray emission pattern is projected away from the optical substrate.

5. The system of claim 1 wherein the optical substrate is fabricated from polymethyl methacrylate.

6. The system of claim 1 comprising fabricating the optical substrate from a polycarbonate material.

7. The system of claim 1 wherein the optical substrate is substantially translucent.

8. The system of claim 1 wherein the optical substrate is approximately 0.05 inches thick to approximately twelve inches thick.

9. The system of claim 1 wherein the optical void pattern comprises a plurality of microfractures in the optical substrate.

10. The system of claim 1 wherein the light ray emission pattern is offset at an angle away from the light source.

11. The system of claim 1 wherein the optical void pattern is formed into a first surface and a second surface of the optical substrate.

12. The system of claim 1 wherein the optical void pattern is configured to concentrate the light rays such that the light ray emission pattern becomes brighter.

13. The system of claim 1 wherein the optical void pattern is configured to disperse the light rays such that the light ray emission pattern becomes dimmer.

* * * * *